US010769869B2

(12) United States Patent
Grunbok, II et al.

(10) Patent No.: US 10,769,869 B2
(45) Date of Patent: Sep. 8, 2020

(54) SELF-DRIVING VEHICLE INTEGRITY MANAGEMENT ON A BLOCKCHAIN

(71) Applicant: International Business Machines Corporation, Armonk, NY (US)

(72) Inventors: Warren Grunbok, II, Poughkeepsie, NY (US); Jeb R. Linton, Herndon, VA (US)

(73) Assignee: International Business Machines Corporation, Armonk, NY (US)

( * ) Notice: Subject to any disclaimer, the term of this patent is extended or adjusted under 35 U.S.C. 154(b) by 252 days.

(21) Appl. No.: 16/019,652

(22) Filed: Jun. 27, 2018

(65) Prior Publication Data

US 2020/0005559 A1    Jan. 2, 2020

(51) Int. Cl.
| | | |
|---|---|---|
| G07C 5/08 | (2006.01) | |
| H04L 9/06 | (2006.01) | |
| G05D 1/00 | (2006.01) | |
| G06Q 50/30 | (2012.01) | |
| G07C 5/00 | (2006.01) | |
| H04L 9/32 | (2006.01) | |
| G06Q 10/02 | (2012.01) | |
| G08G 1/00 | (2006.01) | |

(52) U.S. Cl.
CPC ......... *G07C 5/0808* (2013.01); *G05D 1/0088* (2013.01); *G06Q 10/02* (2013.01); *G06Q 50/30* (2013.01); *G07C 5/008* (2013.01); *G08G 1/202* (2013.01); *H04L 9/0637* (2013.01); *H04L 9/3242* (2013.01); *G05D 2201/0213* (2013.01)

(58) Field of Classification Search
CPC ...... G07C 5/0808; G07C 5/008; G06Q 10/02; G06Q 50/30; G08G 1/202
See application file for complete search history.

(56) References Cited

U.S. PATENT DOCUMENTS

| | | | |
|---|---|---|---|
| 9,646,356 | B1 | 5/2017 | Schwie et al. |
| 9,646,428 | B1 | 5/2017 | Konrardy et al. |
| 9,688,244 | B2 | 6/2017 | Martin et al. |
| 2016/0086139 | A1 | 3/2016 | White |
| 2016/0255154 | A1 | 9/2016 | Kim et al. |
| 2016/0301698 | A1 | 10/2016 | Katara et al. |
| 2016/0306966 | A1 | 10/2016 | Srivastava et al. |

(Continued)

OTHER PUBLICATIONS

Koopman et al., "Autonomous Vehicle Safety: An Interdisciplinary Challenge", IEEE Intelligent Transportation Systems Magazine, vol. 9 No. 1, Jan. 2017, pp. 90-96.

(Continued)

*Primary Examiner* — Todd Melton

(57) ABSTRACT

An example operation may include one or more of receiving a vehicle request from a user device, upon arrival of a vehicle to a requested location, comparing vehicle cryptographic hash key information associated with the vehicle with user device cryptographic hash key information to identify a current status of the vehicle, determining whether the current status of the vehicle passes an appraisal standard stored in a smart contract, and when the current status of the vehicle is identified as passing the appraisal standard and the cryptographic hash key information associated with the vehicle matches the user device cryptographic hash key information, notifying the user device of an approval of the appraisal standard.

20 Claims, 10 Drawing Sheets

(56) References Cited

U.S. PATENT DOCUMENTS

| | | |
|---|---|---|
| 2016/0342791 A1 | 11/2016 | Gonzalez et al. |
| 2017/0132934 A1 | 5/2017 | Kentley et al. |
| 2017/0139411 A1 | 5/2017 | Hartung et al. |
| 2017/0147959 A1 | 5/2017 | Sweeney et al. |
| 2017/0169208 A1 | 6/2017 | Jantz et al. |
| 2017/0372431 A1 | 12/2017 | Perl et al. |
| 2019/0305957 A1* | 10/2019 | Reddy .................. G06F 21/645 |
| 2019/0375373 A1* | 12/2019 | Pepe .................... B60R 25/246 |
| 2019/0392118 A1* | 12/2019 | Elden ...................... H04L 63/00 |
| 2019/0394046 A1* | 12/2019 | Su ............................ G06F 8/65 |

OTHER PUBLICATIONS

Shaheen et al., "Autonomous Carsharing/Taxi Pathways", TRB Automated Vehicles Symposium, 2014 (p. 4, paras 1-3).https://itspubs.ucdavis.edu/files/carsharing_taxi.pdf.

\* cited by examiner

SELF-DRIVING VEHICLE INTEGRITY MANAGEMENT ON A BLOCKCHAIN

TECHNICAL FIELD

This application generally relates to management of self-driving vehicles, and more particularly, to using a blockchain infrastructure to manage the procedures associated with soliciting and using a self-driving vehicle and providing self-driving vehicle integrity management on a blockchain.

BACKGROUND

A ledger is commonly defined as an account book of entry, in which transactions are recorded. A distributed ledger is ledger that is replicated in whole or in part to multiple computers. A Cryptographic Distributed Ledger (CDL) can have at least some of these properties: irreversibility (once a transaction is recorded, it cannot be reversed), accessibility (any party can access the CDL in whole or in part), chronological and time-stamped (all parties know when a transaction was added to the ledger), consensus based (a transaction is added only if it is approved, typically unanimously, by parties on the network), verifiability (all transactions can be cryptographically verified). A blockchain is an example of a CDL. While the description and figures herein are described in terms of a blockchain, the instant application applies equally to any CDL.

A distributed ledger is a continuously growing list of records that typically apply cryptographic techniques such as storing cryptographic hashes relating to other blocks. A blockchain is one common instance of a distributed ledger and may be used as a public ledger to store information. Although, primarily used for financial transactions, a blockchain can store various information related to goods and services (i.e., products, packages, status, etc.). A decentralized scheme provides authority and trust to a decentralized network and enables its nodes to continuously and sequentially record their transactions on a public "block", creating a unique "chain" referred to as a blockchain. Cryptography, via hash codes, is used to secure an authentication of a transaction source and removes a central intermediary. Blockchain is a distributed database that maintains a continuously-growing list of records in the blockchain blocks, which are secured from tampering and revision due to their immutable properties. Each block contains a timestamp and a link to a previous block. Blockchain can be used to hold, track, transfer and verify information. Since blockchain is a distributed system, before adding a transaction to the blockchain ledger, all peers need to reach a consensus status.

Conventionally, vehicle services are offered without certainty to the customers, the locality and other interested parties. Concerns about vehicles for hire include driver integrity, insurance policies, security, compliance, vehicle integrity, etc. The advent of driverless vehicles has spawned additional concerns to persons who have yet to see a vehicle drive without a driver and have yet to enter the vehicle and trust the process which could be life endangering. The security and integrity of such a new and radical concept requires compliance records and affirmation of compliance with all local government and private regulations. Blockchain infrastructures provide reliability and immutable records necessary to affirm important records and other data to ensure integrity for safety and compliance.

SUMMARY

One example embodiment may provide a method that includes one or more of receiving a vehicle request from a user device, upon arrival of a candidate vehicle to a requested location, comparing vehicle cryptographic hash key information associated with the vehicle with user device cryptographic hash key information to identify a current status of the vehicle, determining whether the current status of the vehicle passes an appraisal standard stored in a blockchain, and when the current status of the vehicle is identified as passing the appraisal standard, notifying the user device of an approval of the appraisal standard.

Another example embodiment may include a method that provides one or more of receiving a vehicle request from a user device, upon arrival of a vehicle to a requested location, comparing vehicle cryptographic hash key information associated with the vehicle with user device cryptographic hash key information to identify a current status of the vehicle, determining whether the current status of the vehicle passes an appraisal standard stored in a smart contract, and when the current status of the vehicle is identified as passing the appraisal standard and the cryptographic hash key information associated with the vehicle matches the user device cryptographic hash key information, notifying the user device of an approval of the appraisal standard.

Yet another example embodiment may include a system that includes a user device, a vehicle, and a computing node. The computing node is configured to perform one or more of receive a vehicle request from the user device, upon arrival of the vehicle to a requested location, compare vehicle cryptographic hash key information associated with the vehicle with user device cryptographic hash key information to identify a current status of the vehicle, determine whether the current status of the vehicle passes an appraisal standard stored in a smart contract, and when the current status of the vehicle is passes the appraisal standard and the cryptographic hash key information associated with the vehicle matches the user device cryptographic hash key information, notify the user device of an approval of the appraisal standard.

Still yet a further example embodiment may include a non-transitory computer readable storage medium configured to store instructions that when executed cause a processor to perform one or more of receiving a vehicle request from a user device, upon arrival of a vehicle to a requested location, comparing vehicle cryptographic hash key information associated with the vehicle with user device cryptographic hash key information to identify a current status of the vehicle, determining whether the current status of the vehicle passes an appraisal standard stored in a smart contract, and when the current status of the vehicle is identified as passing the appraisal standard and the cryptographic hash key information associated with the vehicle matches the user device cryptographic hash key information, notifying the user device of an approval of the appraisal standard.

DETAILED DESCRIPTION

Figure 1:
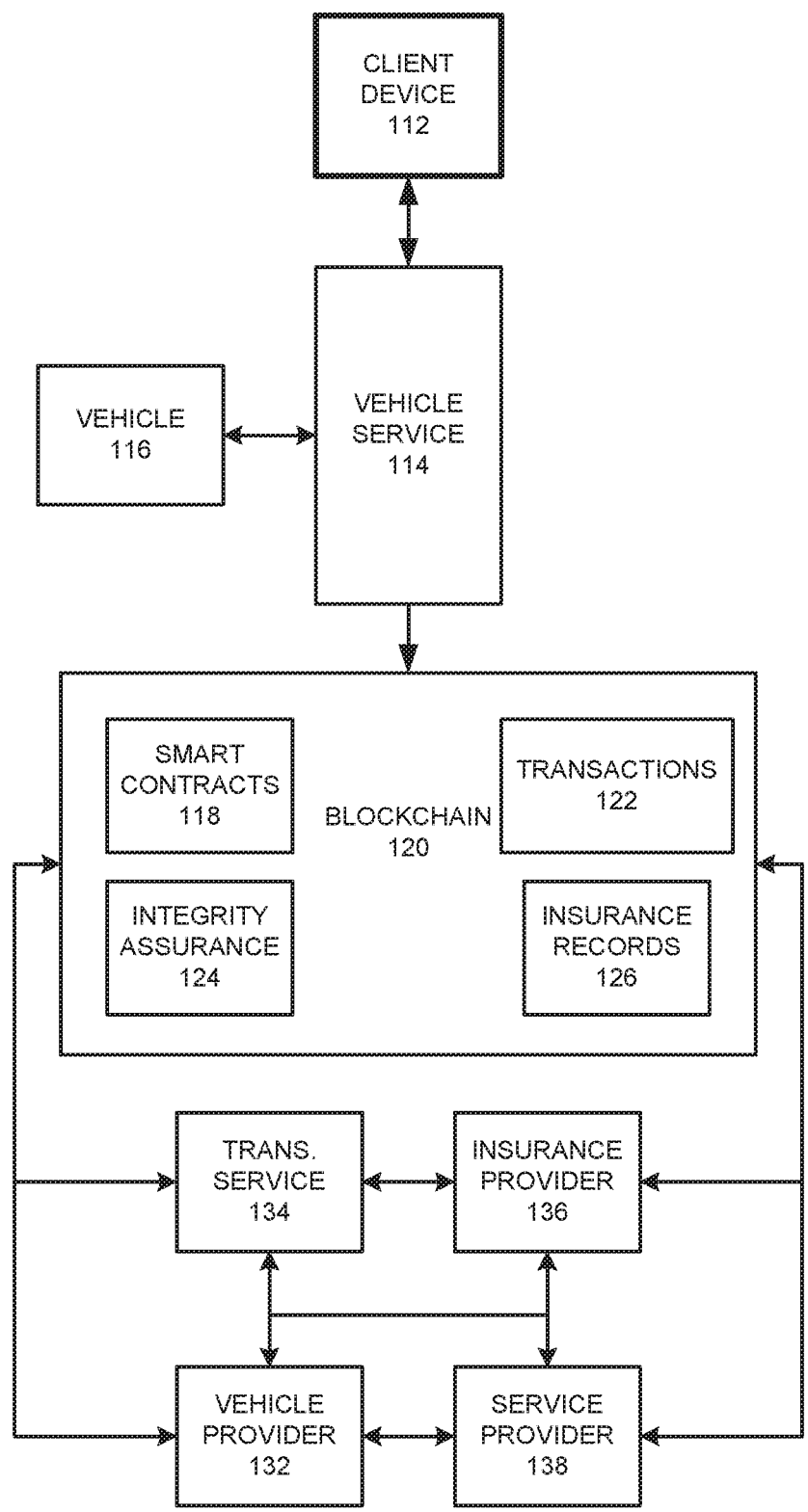
FIG. 1 illustrates a network configuration of a vehicle management system operating on a blockchain network, according to example embodiments.

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

Example embodiments provide methods, devices, networks and/or systems, which provide blockchain-based vehicle services for both driver-based vehicles and driverless vehicles to users soliciting such services. In one example, when a self-driving vehicle is summoned to a user for service, such as when a user/customer accesses an online vehicle service application and requests service, the customer may require assurance of safety standards and accurate recordation of the service instance. One example provides for driverless vehicles being operated by a primary source code installation that provides the latest safety standards in a particular locale or via a nationwide standard. In order to ensure the vehicle which arrives to serve the customer has the latest software installed on its computing platform, both remotely at a server location and within the vehicle's own computing platform, an accurate and secure record of those requirements need to be established via a secure medium, which is free from corruption and illegal tampering.

A blockchain is a distributed system which includes multiple nodes that communicate with each other. A blockchain operates programs called chaincode (e.g., smart contracts, etc.), holds state and ledger data, and executes transactions. Some transactions are operations invoked on the chaincode. In general, blockchain transactions typically must be "endorsed" by certain blockchain members and only endorsed transactions may be committed to the blockhcain and have an effect on the state of the blockchain. Other transactions which are not endorsed are disregarded. There may exist one or more special chaincodes for management functions and parameters, collectively called system chaincodes. Such chaincodes are organized and stored in smart contracts to ensure compliance and management processes during vehicle dispatch and operation.

Nodes are the communication entities of the blockchain system. A "node" may perform a logical function in the sense that multiple nodes of different types can run on the same physical server. Nodes are grouped in trust domains and are associated with logical entities that control them in various ways. Nodes may include different types, such as a client or submitting-client node which submits a transaction-invocation to an endorser (e.g., peer), and broadcasts transaction-proposals to an ordering service (e.g., ordering node). Another type of node is a peer node which can receive client submitted transactions, commit the transactions and maintain a state and a copy of the ledger of blockchain transactions. Peers can also have the role of an endorser, although it is not a requirement. An ordering-service-node or orderer is a node running the communication service for all nodes, and which implements a delivery guarantee, such as a broadcast to each of the peer nodes in the system when committing transactions and modifying a world state of the blockchain, which is another name for the initial blockchain transaction which normally includes control and setup information.

A ledger is a sequenced, tamper-resistant record of all state transitions of a blockchain. State transitions may result from chaincode invocations (i.e., transactions) submitted by participating parties (e.g., client nodes, ordering nodes, endorser nodes, peer nodes, etc.). A transaction may result in a set of asset key-value pairs being committed to the ledger as one or more operands, such as creates, updates, deletes, and the like. The ledger includes a blockchain (also referred to as a chain) which is used to store an immutable, sequenced record in blocks. The ledger also includes a state database which maintains a current state of the blockchain. There is typically one ledger per channel. Each peer node maintains a copy of the ledger for each channel of which they are a member.

A chain is a transaction log which is structured as hash-linked blocks, and each block contains a sequence of N transactions where N is equal to or greater than one. The block header includes a hash of the block's transactions, as well as a hash of the prior block's header. In this way, all transactions on the ledger may be sequenced and cryptographically linked together. Accordingly, it is not possible to tamper with the ledger data without breaking the hash links. A hash of a most recently added blockchain block represents every transaction on the chain that has come before it, making it possible to ensure that all peer nodes are in a consistent and trusted state. The chain may be stored on a peer node file system (i.e., local, attached storage, cloud, etc.), efficiently supporting the append-only nature of the blockchain workload.

The current state of the immutable ledger represents the latest values for all keys that are included in the chain transaction log. Because the current state represents the latest key values known to a channel, it is sometimes referred to as a world state. Chaincode invocations execute transactions against the current state data of the ledger. To make these chaincode interactions efficient, the latest values of the keys may be stored in a state database. The state database may be simply an indexed view into the chain's transaction log, it can therefore be regenerated from the chain at any time. The state database may automatically be recovered (or generated if needed) upon peer node startup, and before transactions are accepted.

FIG. 1 illustrates a network configuration of a vehicle management system operating on a blockchain network, according to example embodiments. Referring to FIG. 1, the configuration 100 provides a client device 112 which may be operated by a customer of a vehicle service provider, a vehicle service 114, which communicates with the customer's device 112 and the remote vehicles 116 to dispatch vehicles, communicate with customers and provide vehicle services. The blockchain 120 may be a permissioned blockchain that stores blockchain transactions for each customer interaction, vehicle rental, and/or related services. A smart contract 118 may be established to include information regarding the parties, such as the customer, the vehicle provider, the vehicle identification, insurance, dates, etc. Transaction information 122 may also be stored along with insurance records 126 and integrity assurance information 124, such as software compliance in the vehicle and the management server operating the vehicle.

In general, the parties to a vehicle rental service may include the customer, a transaction service provider 134, the insurance provider 136, the vehicle provider 132 and/or the vehicle service provider 138. Once the vehicle is identified for the customer booking, the parties to the agreement procedure may require affirmation via a blockchain transaction that the vehicle is updated with the required software, especially for a self-driving vehicle, and that the hash codes linked to the vehicles software build, the service provider and the customer's device are all matching prior to accepting the contract for the vehicle service.

In one example method of operation, a customer or user of a client device 112 may request a vehicle ride, such as by an autonomous vehicle. This causes the vehicle service provider 138 to summon the service for an available transport vehicle in the network associated with the service provider. The vehicle may be selected depending on its location, service capabilities, etc. Upon arrival to the customer's requested location, which may be identified from a GPS location service linked to the client device 112, the vehicle 116 would communicate with the client device 112, via through the service provider backend server 138, to perform a software assessment (i.e., appraisal) of the security posture of the software and/or firmware expected for the vehicle. This may be compared to the vehicle service provider's software build(s) for compliance reasons. This process may include the exchanging and comparing of cryptographic hashes of each of the vehicle parties for a comparison of those keys to ensure integrity and as a condition precedent to accepting the transaction and logging the blockchain transaction. The appraisal of the software operating system may include identifying a build number or identifier for the version currently being operated by the vehicle and/or the vehicle provider. The firmware and software may also be checked for an appropriate patch and determined to be free of known security vulnerabilities by a certificate or other standard for integrity prior to acceptance.

Upon a successful appraisal of the security posture status of the software and other information, the client device application would receive an approval or disapproval. Once the security appraisal of the vehicle is approved, insurance requirements, etc., may also be approved by a third party, such as the service provider of the vehicle. This may include a transaction sequence of transactions using the blockchain as the ledger of transactions between the customer, the vehicle owner, the vehicle service and the other third parties (i.e., insurance, services, government regulator, etc.). The customer may be the initiator of the blockchain transaction by requesting the vehicle and/or the final approval for such a service. The transaction would only be approved once the security appraisal of the vehicle was accurate and was signed-off by the customer's and the owner's insurance companies and the transaction authorizer organization. Once all the blockchain signatories required by the consensus peers are signed-off with regard to the agreement, the smart contract may be enabled, and its terms may be deemed satisfied for purposes of renting the vehicle. Next, the customer may see the approval to use and enter the vehicle, which is then unlocked at its intended destination, as a result of the compliance procedure.

Figure 2A:
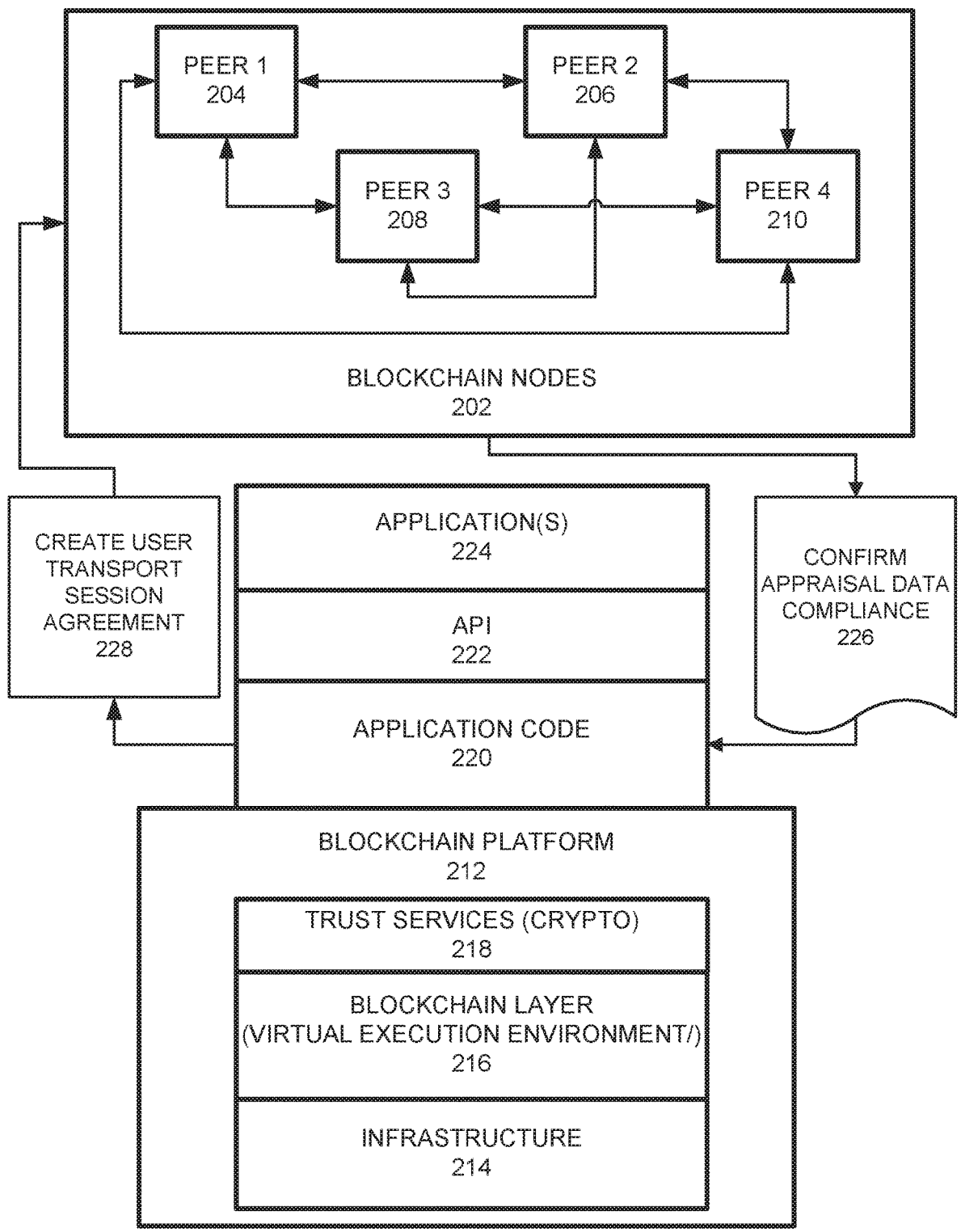
FIG. 2A illustrates an example peer node blockchain architecture configuration for performing blockchain modification operations, according to example embodiments.

FIG. 2A illustrates a blockchain architecture configuration 200, according to example embodiments. Referring to FIG. 2A, the blockchain architecture 200 may include certain blockchain elements, for example, a group of blockchain nodes 202. The blockchain nodes 202 may include one or more nodes 204-210. (4 nodes are depicted by example only). These nodes participate in a number of activities, such as blockchain transaction addition and validation process (consensus). One or more of the blockchain nodes 204-210 may endorse transactions and may provide an ordering service for all blockchain nodes in the architecture 200. A blockchain node may initiate a blockchain authentication and seek to write to a blockchain immutable ledger stored in blockchain layer 216, a copy of which may also be stored on the underpinning physical infrastructure 214. The blockchain configuration may include one or applications 224 which are linked to application programming interfaces (APIs) 222 to access and execute stored program/application code 220 (e.g., chaincode, smart contracts, etc.) which can be created according to a customized configuration sought by participants and can maintain their own state, control their own assets, and receive external information. This can be deployed as a transaction and installed, via appending to the distributed ledger, on all blockchain nodes 204-210.

The blockchain base or platform 212 may include various layers of blockchain data, services (e.g., cryptographic trust services, virtual execution environment, etc.), and underpinning physical computer infrastructure that may be used to receive and store new transactions and provide access to auditors which are seeking to access data entries. The blockchain layer 216 may expose an interface that provides access to the virtual execution environment necessary to process the program code and engage the physical infrastructure 214. Cryptographic trust services 218 may be used to verify transactions such as asset exchange transactions and keep information private.

The blockchain architecture configuration of FIG. 2A may process and execute program/application code 220 via one or more interfaces exposed, and services provided, by blockchain platform 212. The code 220 may control blockchain assets. For example, the code 220 can store and transfer data, and may be executed by nodes 204-210 in the form of a smart contract and associated chaincode with conditions or other code elements subject to its execution. As a non-limiting example, smart contracts may be created to execute reminders, updates, and/or other notifications subject to the changes, updates, etc. The smart contracts can themselves be used to identify rules associated with authorization and access requirements and usage of the ledger.

Within chaincode, a smart contract may be created via a high-level application and programming language, and then written to a block in the blockchain. The smart contract may include executable code which is registered, stored, and/or replicated with a blockchain (e.g., distributed network of blockchain peers). A transaction is an execution of the smart contract code which can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols.

The smart contract may write data to the blockchain in the format of key-value pairs. Furthermore, the smart contract code can read the values stored in a blockchain and use them in application operations. The smart contract code can write the output of various logic operations into the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment, then deleted once the data needed for the blockchain is identified.

A chaincode may include the code interpretation of a smart contract, with additional features. As described herein, the chaincode may be program code deployed on a computing network, where it is executed and validated by chain validators together during a consensus process. The chaincode receives a hash and retrieves from the blockchain a hash associated with the data template created by use of a previously stored feature extractor. If the hashes of the hash identifier and the hash created from the stored identifier template data match, then the chaincode sends an authorization key to the requested service. The chaincode may write to the blockchain data associated with the cryptographic details. In FIG. 2A, in one example, certain appraisal data may be identified and analyzed for compliance with expected values 226. Once the information is identified and the expected values are confirmed, the smart contract and/or other types of approval may be executed to solidify the transport agreement 228 so the customer may receive access to the transport.

Figure 2B:
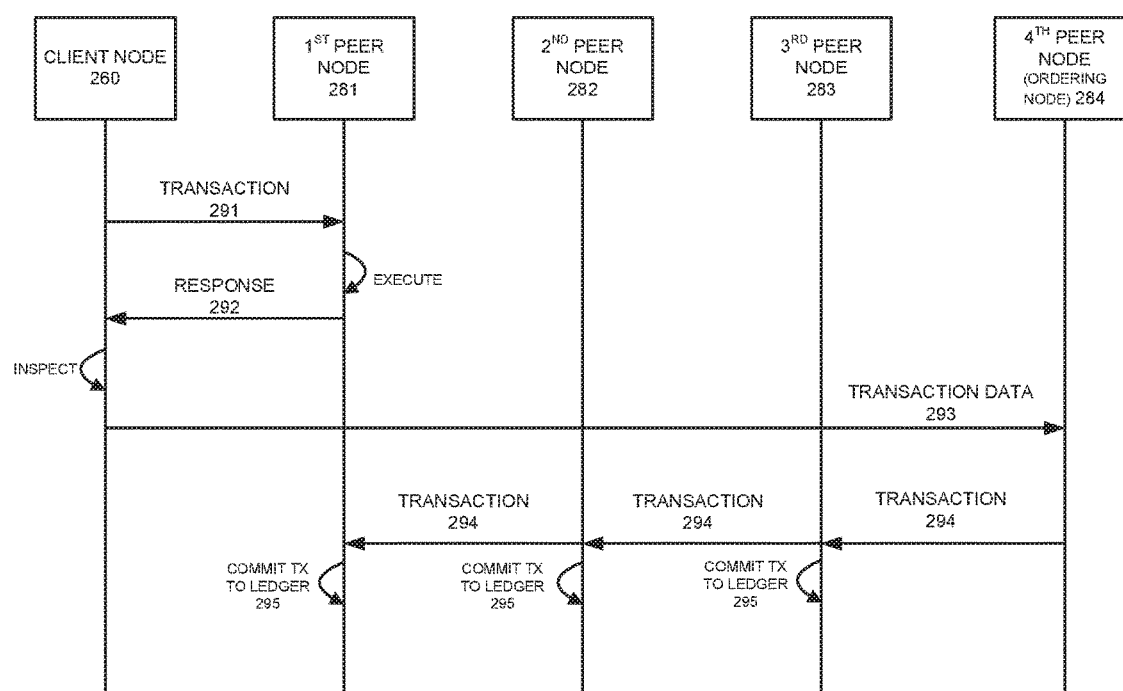
FIG. 2B illustrates an example peer node blockchain configuration, according to example embodiments.

FIG. 2B illustrates an example of a transactional flow 250 between nodes of the blockchain in accordance with an example embodiment. Referring to FIG. 2B, the transaction flow may include a transaction proposal 291 sent by an application client node 260 to an endorsing peer node 281. The endorsing peer 281 may verify the client signature and execute a chaincode function to initiate the transaction. The output may include the chaincode results, a set of key/value versions that were read in the chaincode (read set), and the set of keys/values that were written in chaincode (write set). The proposal response 292 is sent back to the client 260 along with an endorsement signature, if approved. The client 260 assembles the endorsements into a transaction payload 293 and broadcasts it to an ordering service node 284. The ordering service node 284 then delivers ordered transactions as blocks to all peers 281-283 on a channel. Before committal to the blockchain, each peer 281-283 may validate the transaction. For example, the peers may check the endorsement policy to ensure that the correct allotment of the specified peers have signed the results and authenticated the signatures against the transaction payload 293.

Referring again to FIG. 2B, the client node 260 initiates the transaction 291 by constructing and sending a request to the peer node 281, which is an endorser. The client 260 may include an application leveraging a supported software development kit (SDK), such as NODE, JAVA, PYTHON, and the like, which utilizes an available API to generate a transaction proposal. The proposal is a request to invoke a chaincode function so that data can be read and/or written to the ledger (i.e., write new key value pairs for the assets). The SDK may serve as a shim to package the transaction proposal into a properly architected format (e.g., protocol buffer over a remote procedure call (RPC)) and take the client's cryptographic credentials to produce a unique signature for the transaction proposal.

In response, the endorsing peer node 281 may verify (a) that the transaction proposal is well formed, (b) the transaction has not been submitted already in the past (replay-attack protection), (c) the signature is valid, and (d) that the submitter (client 260, in the example) is properly authorized to perform the proposed operation on that channel. The endorsing peer node 281 may take the transaction proposal inputs as arguments to the invoked chaincode function. The chaincode is then executed against a current state database to produce transaction results including a response value, read set, and write set. However, no updates are made to the ledger at this point. In 292, the set of values, along with the endorsing peer node's 281 signature is passed back as a proposal response 292 to the SDK of the client 260 which parses the payload for the application to consume.

In response, the application of the client 260 inspects/verifies the endorsing peers signatures and compares the proposal responses to determine if the proposal response is the same. If the chaincode only queried the ledger, the application would inspect the query response and would typically not submit the transaction to the ordering node service 284. If the client application intends to submit the transaction to the ordering node service 284 to update the ledger, the application determines if the specified endorsement policy has been fulfilled before submitting (i.e., did all peer nodes necessary for the transaction endorse the transaction). Here, the client may include only one of multiple parties to the transaction. In this case, each client may have their own endorsing node, and each endorsing node will need to endorse the transaction. The architecture is such that even if an application selects not to inspect responses or otherwise forwards an unendorsed transaction, the endorsement policy will still be enforced by peers and upheld at the commit validation phase.

After successful inspection, in step 293 the client 260 assembles endorsements into a transaction and broadcasts the transaction proposal and response within a transaction message to the ordering node 284. The transaction may contain the read/write sets, the endorsing peers signatures and a channel ID. The ordering node 284 does not need to inspect the entire content of a transaction in order to perform its operation, instead the ordering node 284 may simply receive transactions from all channels in the network, order them chronologically by channel, and create blocks of transactions per channel.

The blocks of the transaction are delivered from the ordering node 284 to all peer nodes 281-283 on the channel. The transactions 294 within the block are validated to ensure any endorsement policy is fulfilled and to ensure that there have been no changes to ledger state for read set variables since the read set was generated by the transaction execution. Transactions in the block are tagged as being valid or invalid. Furthermore, in step 295 each peer node 281-283 appends the block to the channel's chain, and for each valid transaction the write sets are committed to current state database. An event is emitted, to notify the client application that the transaction (invocation) has been immutably appended to the chain, as well as to notify whether the transaction was validated or invalidated.

Figure 3:
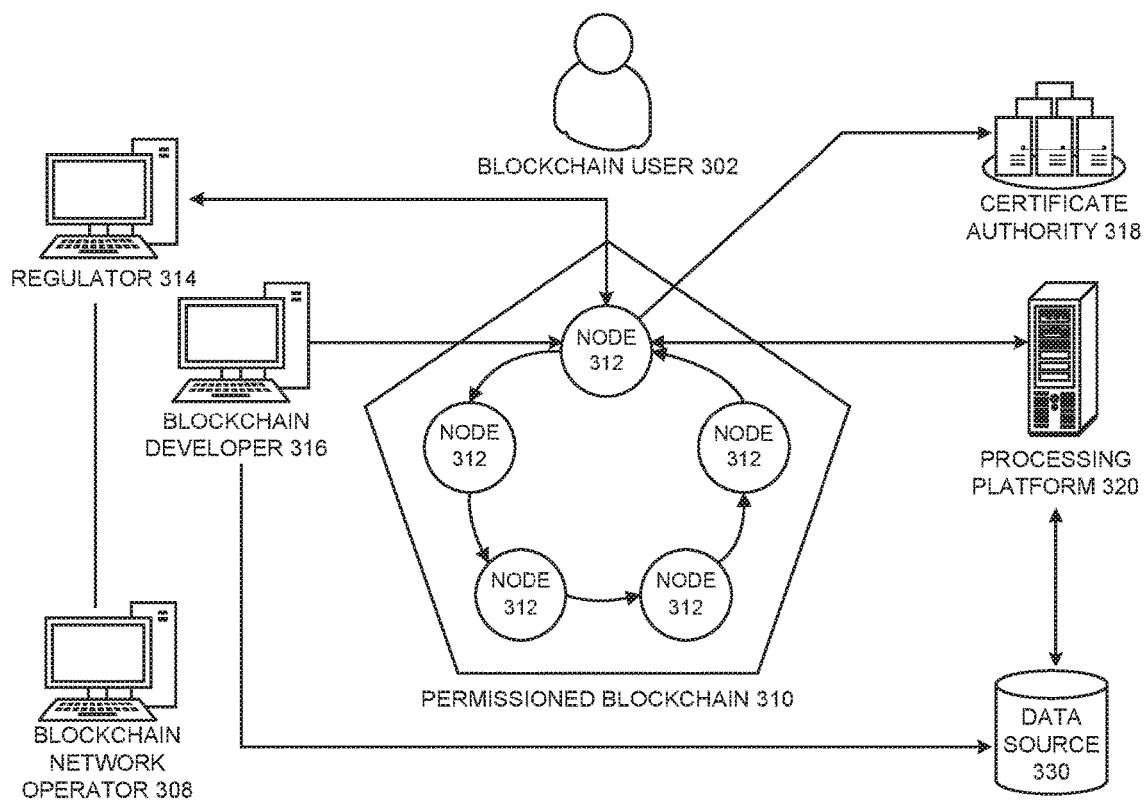
FIG. 3 is a diagram illustrating a permissioned blockchain network, according to example embodiments.

FIG. 3 illustrates an example of a permissioned blockchain network 300, which features a distributed, decentralized peer-to-peer architecture, and a certificate authority 318 managing user roles and permissions. In this example, the blockchain user 302 may submit a transaction to the permissioned blockchain network 310. In this example, the transaction can be a deploy, invoke or query, and may be issued through a client-side application leveraging an SDK, directly through a REST API, or the like. Trusted business networks may provide access to regulator systems 314, such as auditors (the Securities and Exchange Commission in a U.S. equities market, for example). Meanwhile, a blockchain network operator system of nodes 308 manage member permissions, such as enrolling the regulator system 310 as an "auditor" and the blockchain user 302 as a "client." An auditor could be restricted only to querying the ledger whereas a client could be authorized to deploy, invoke, and query certain types of chaincode.

A blockchain developer system 316 writes chaincode and client-side applications. The blockchain developer system 316 can deploy chaincode directly to the network through a REST interface. To include credentials from a traditional data source 330 in chaincode, the developer system 316 could use an out-of-band connection to access the data. In this example, the blockchain user 302 connects to the network through a peer node 312. Before proceeding with any transactions, the peer node 312 retrieves the user's enrollment and transaction certificates from the certificate authority 318. In some cases, blockchain users must possess these digital certificates in order to transact on the permissioned blockchain network 310. Meanwhile, a user attempting to drive chaincode may be required to verify their credentials on the traditional data source 330. To confirm the user's authorization, chaincode can use an out-of-band connection to this data through a traditional processing platform 320.

Figure 4:
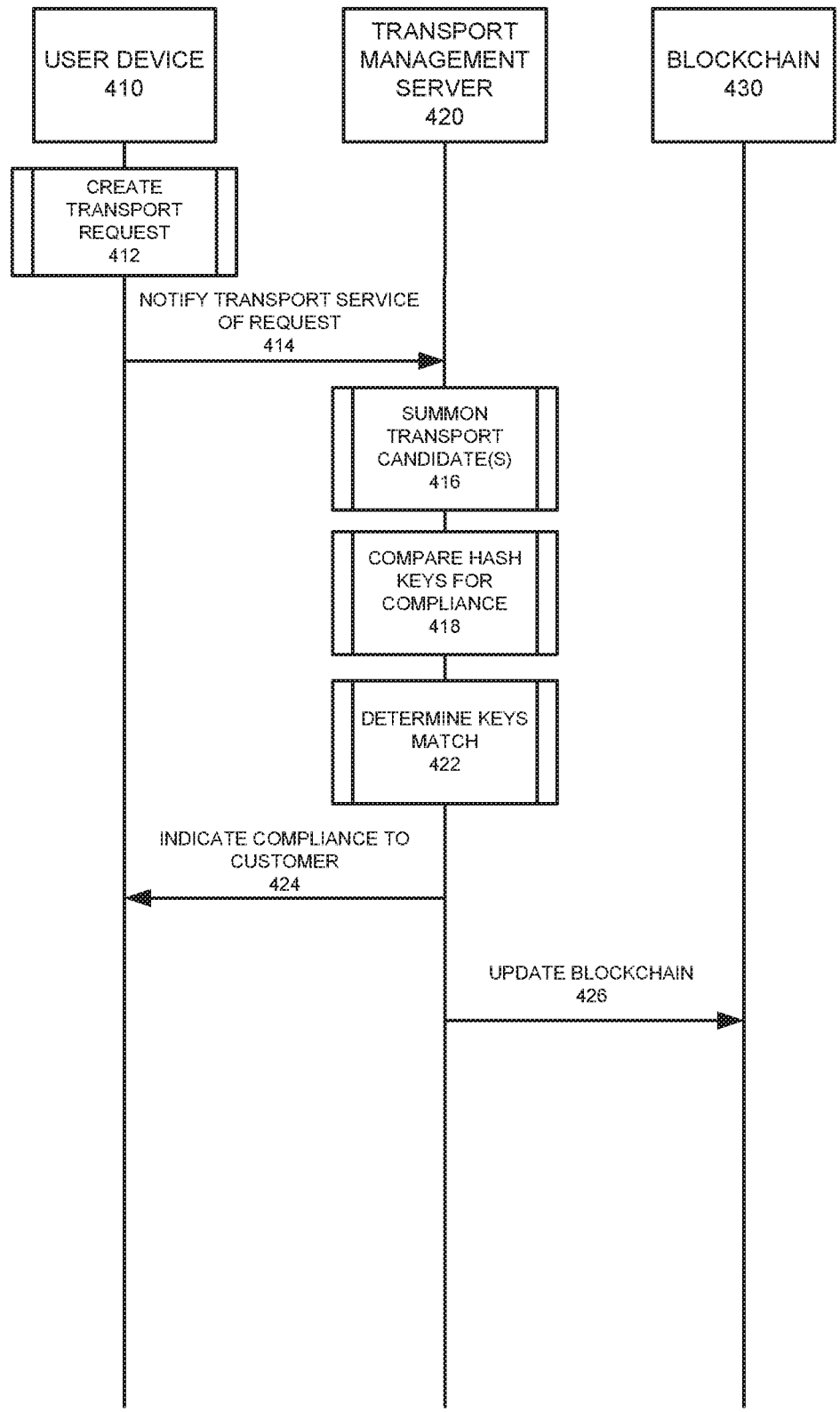
FIG. 4 illustrates a system messaging diagram for a vehicle management blockchain configuration, according to example embodiments.

FIG. 4 illustrates a system diagram for a vehicle management blockchain configuration, according to example embodiments. In FIG. 4, the approach 400 may provide a user device 410 that communicates with a transport management server 420 to create a transport request 412 and notify the transport service of the request 414. When a customer summons a vehicle, the vehicle service owner initiates a binding with the appropriate vehicle based on the customer's vehicle profile preferences and available vehicle location or expected time to delivery requirements. The vehicle can then be summoned 416. At that time the blockchain 430 initiates and the vehicle's software integrity check begins. The information hashed includes the customer's credentials, the service owner's credentials, the transaction method credentials, and the insurance credentials of the vehicle owner and the customer. Once the vehicle integrity check in performed and received, the information is added to the hash chain of the blockchain transaction. The hashes on both ends are compared for compliance 418. Then the authorization with the customer's account information is added to the hash chain of the transaction. When the keys match 422, the customer may be notified with a final acceptance message 424. The vehicle owner's insurance information may also be added to the hash chain along with the customer's personal liability information. The vehicle owner would send a final confirmation to the customer for prompting acceptance of the vehicle service. Upon arrival of the vehicle, the customer would have a smart phone application with the appropriate verification code so they could open the vehicle remotely with the phone application, which is essentially serving as the entry and remote start key of the vehicle. The transaction is then updated 426 in the blockchain 430.

The vehicle must pass a software integrity check using remote attestation. Remote attestation is based on a known set of software checks that would use currently available mechanisms such as an appraisal. The successful integrity check would be added to the hash. The vehicle may also be required to pass a hardware (i.e., mechanical) self-check. Any sensors such as maintenance reminders, brake wear indicators, emissions checks etc., can be checked for integrity and used to confirm/deny that the vehicle is checked, and if no failures are presented, a successful hardware check would be added to the hash information of the blockchain transaction. The customer must have the transaction account needed to rent the vehicle, and this will require an approval/disapproval process. Both the vehicle owner and the customer must have the proper liability insurance. At any time, any party can cancel the blockchain transaction, and the customer will be able to view the approvals/disapprovals as pieces of information which are added to the hash. At each of the above stages, each member of the blockchain would check (read) to ensure that each prior step has successfully completed, and at any stage, if there is a failure, all parties are notified, and the customer would be given an option to see where the failure lies and possibly correct the outstanding error(s). For example, should authorization fail, perhaps for insufficient account data, the user could provide an additional account or alternative account thereby initiating a new blockchain transaction with different account information.

Figure 5A:
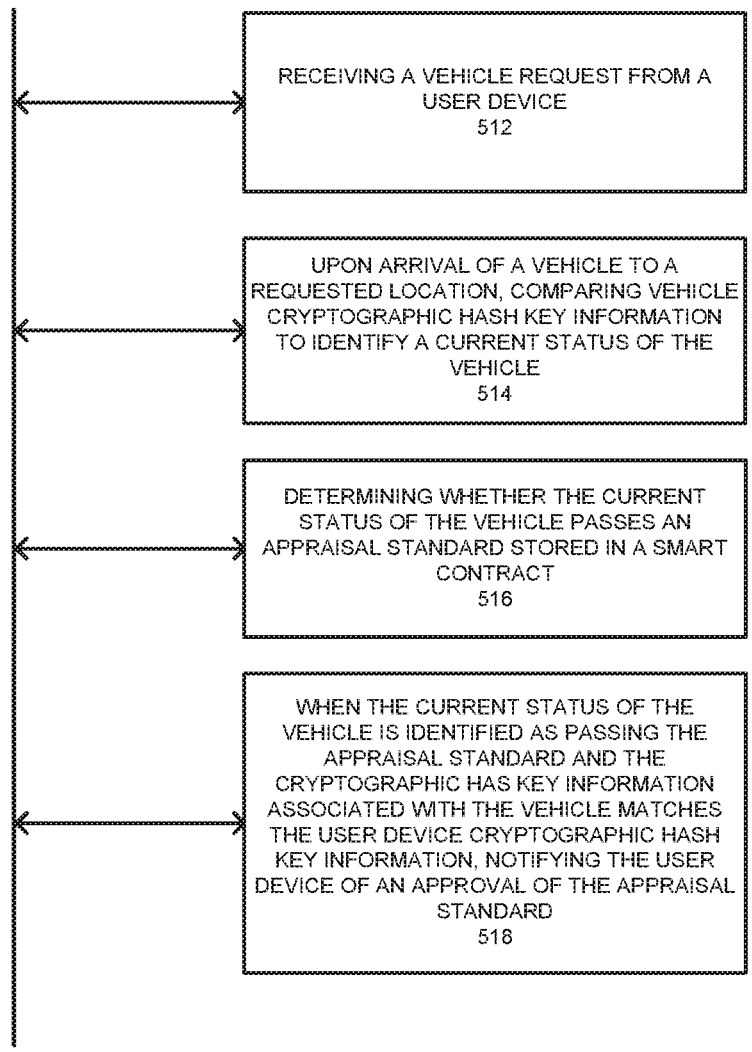
FIG. 5A illustrates a flow diagram of an example vehicle management blockchain configuration, according to example embodiments.

FIG. 5A illustrates a flow diagram of an example method of blockchain rule modification management, according to example embodiments. Referring to FIG. 5A, the method example 500 may include receiving a vehicle request from a user device 512, upon arrival of a vehicle to a requested location or just identifying the vehicle, comparing vehicle cryptographic hash key information associated with the vehicle with user device cryptographic hash key information to identify a current status of the vehicle and to ensure the compliance with expected standards 514. The method may also include determining whether the current status of the vehicle passes an appraisal standard stored in a smart contract 516, and when the current status of the vehicle is identified as passing the appraisal standard and the cryptographic hash key information associated with the vehicle matches the user device cryptographic hash key information, notifying the user device of an approval of the appraisal standard 518.

The inclusion of a hash comparison operation provides a security and standard matching feature to ensure compliance with standards established by government, the partners to the management entity and others. By using the blockchain to retrieve, update and store the most recent standards in blockchain transactions, and by using smart contracts to establish rules and operations for performing such integrity operations, the processing, memory requirements and bandwidth of the network may be optimized to include fewer operations performed on the user device, the management server and via the various auditing entities sharing the information when determining compliance between the vehicle operating system, software builds, safety records, etc., and local and private standards required for both driver based and driverless vehicle transports.

The appraisal standard is based on an appraisal of current operational software installed on the vehicle and the current operational software installed on the vehicle may be identified as having one or more of a current build number and a current update patch installed. The method may also include transmitting a vehicle request command to a vehicle management server, identifying the vehicle to fulfill the vehicle request, and transmitting a vehicle dispatch command to the vehicle. When the current status of the vehicle is identified as passing the appraisal standard, the method may also include creating a blockchain transaction comprising a request for approval from the user device, an approval from an insurance provider, and an approval from an authorization provider. The comparing of the vehicle cryptographic hash key information associated with the vehicle with user device cryptographic hash key information to identify a current status of the vehicle further includes determining a software build installed in the vehicle passes the appraisal standard. The method may also include accepting, via a vehicle management server, a contract between the user device and a vehicle service provider, when the appraisal is identified as passing the appraisal standard.

Figure 5B:
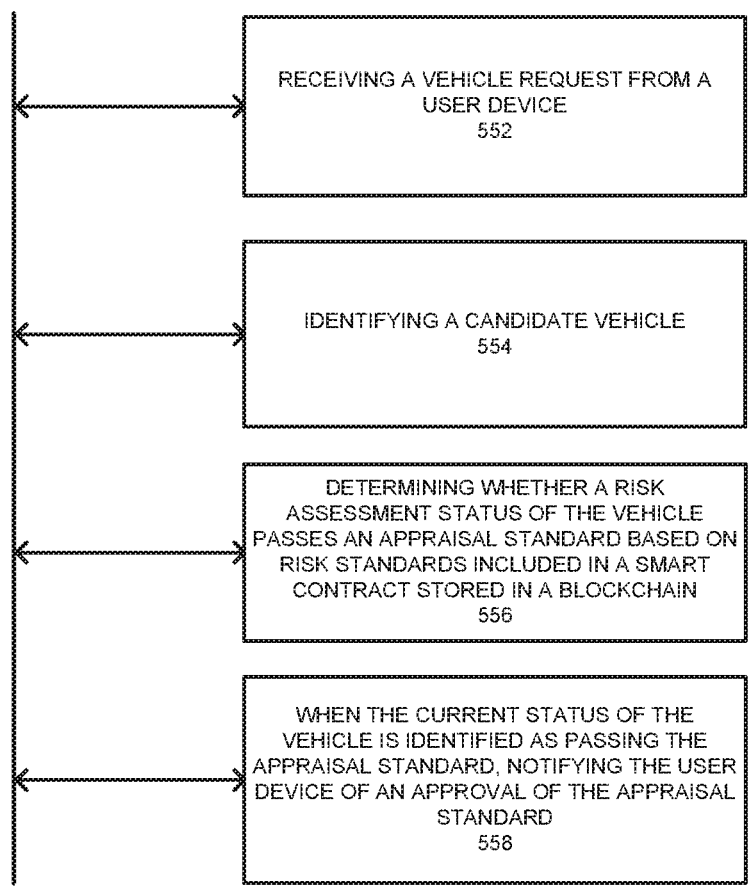
FIG. 5B illustrates a flow diagram of another example vehicle management blockchain configuration, according to example embodiments.

FIG. 5B illustrates a flow diagram of an example method of blockchain rule modification management, according to example embodiments. Referring to FIG. 5B, the method example 550 may include a method that includes receiving a vehicle request from a user device 552, identifying a candidate vehicle 554, determining whether a risk assessment status of the vehicle passes an appraisal standard based on risk standards included in a smart contract stored in a blockchain 556, and when the current status of the vehicle is identified as passing the appraisal standard, notifying the user device of an approval of the appraisal standard 558.

In addition to identifying a current disposition of the software build installed on the vehicle and managed by a vehicle management server, the vehicle may have been logged based on its driving behavior, road actions, highway speed, accident records, etc. The insurance company, transaction service company, customer, etc., may all have certain standards linked to the customer's account and which are part of a smart contract stored on the blockchain. Those standards may be invoked and compared to the vehicle's status prior to permitting that particular vehicle to be part of a contracted vehicle for hire with the customer. A certain risk level may be required to be met when the risk is calculated and used as the basis for whether the vehicle is appropriate for the customer.

Figure 6A:
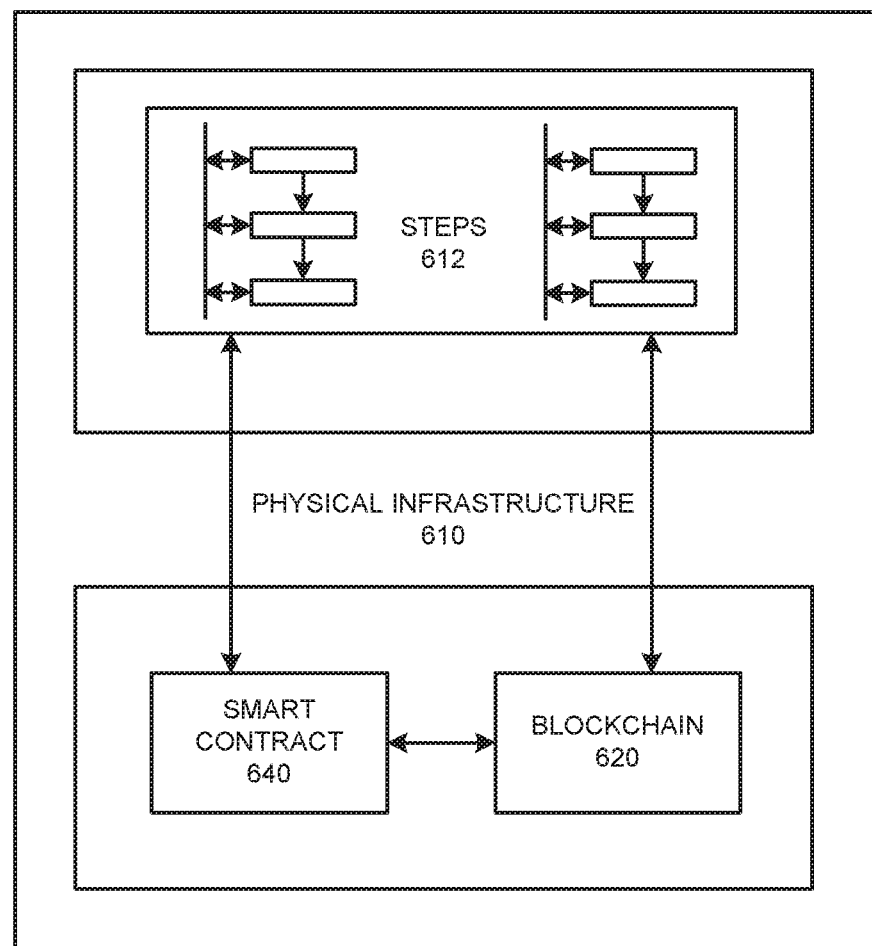
FIG. 6A illustrates an example physical infrastructure configured to perform various operations on the blockchain in accordance with one or more operations described herein, according to example embodiments.

FIG. 6A illustrates an example physical infrastructure configured to perform various operations on the blockchain in accordance with one or more of the example methods of operation according to example embodiments. Referring to FIG. 6A, the example configuration 600 includes a physical infrastructure 610 with a blockchain 620 and a smart contract 640, which may execute any of the operational steps 612 included in any of the example embodiments. The steps/operations 612 may include one or more of the steps described or depicted in one or more flow diagrams and/or logic diagrams. The steps may represent output or written information that is written or read from one or more smart contracts 640 and/or blockchains 620 that reside on the physical infrastructure 610 of a computer system configuration. The data can be output from an executed smart contract 640 and/or blockchain 620. The physical infrastructure 610 may include one or more computers, servers, processors, memories, and/or wireless communication devices.

Figure 6B:
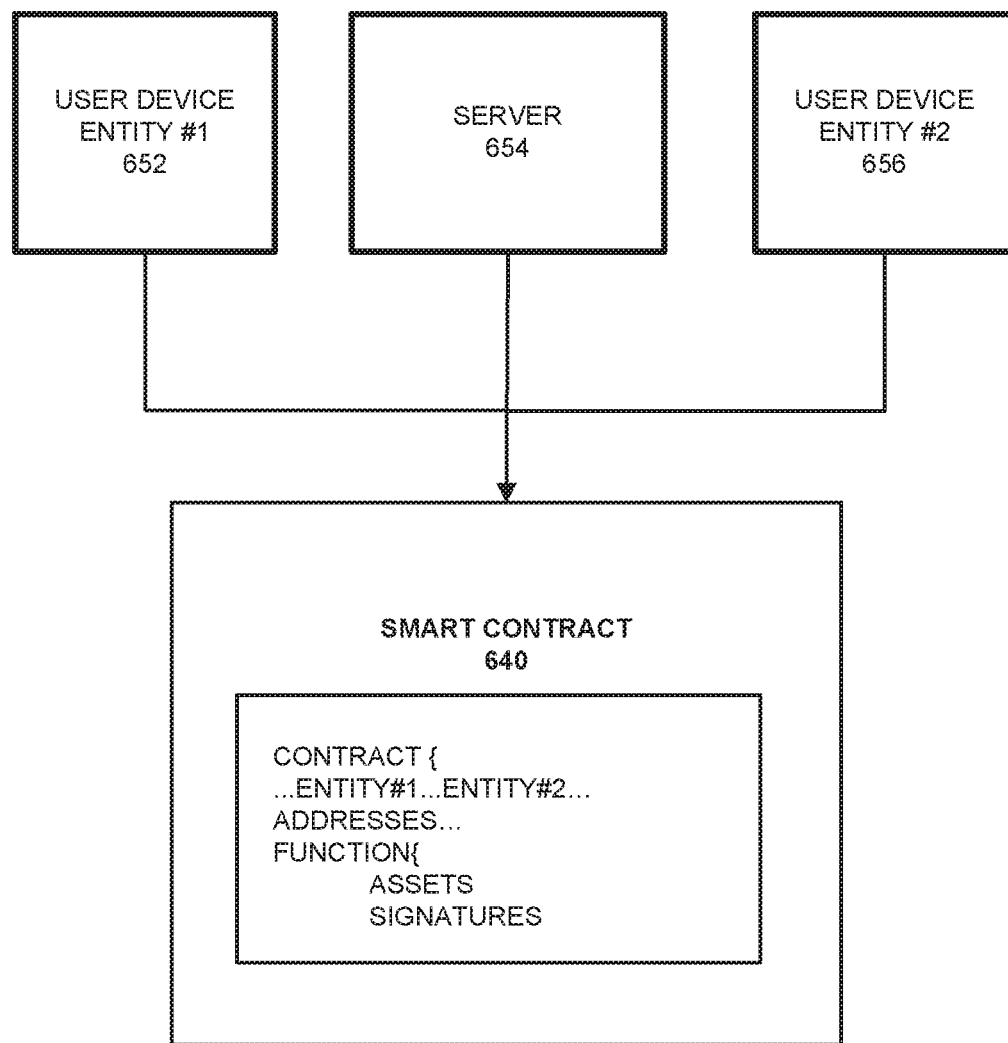
FIG. 6B illustrates an example smart contract configuration among contracting parties and a mediating server configured to enforce smart contract terms on a blockchain, according to example embodiments.

FIG. 6B illustrates an example smart contract configuration among contracting parties and a mediating server configured to enforce the smart contract terms on the blockchain according to example embodiments. Referring to FIG. 6B, the configuration 650 may represent a communication session, an asset transfer session or a process or procedure that is driven by a smart contract 640 which explicitly identifies one or more user devices 652 and/or 656. The execution, operations and results of the smart contract execution may be managed by a server 654. Content of the smart contract 640 may require digital signatures by one or more of the entities 652 and 656 which are parties to the smart contract transaction. The results of the smart contract execution may be written to a blockchain as a blockchain transaction.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 7 illustrates an example computer system architecture 700, which may represent or be integrated in any of the above-described components, etc.

Figure 7:
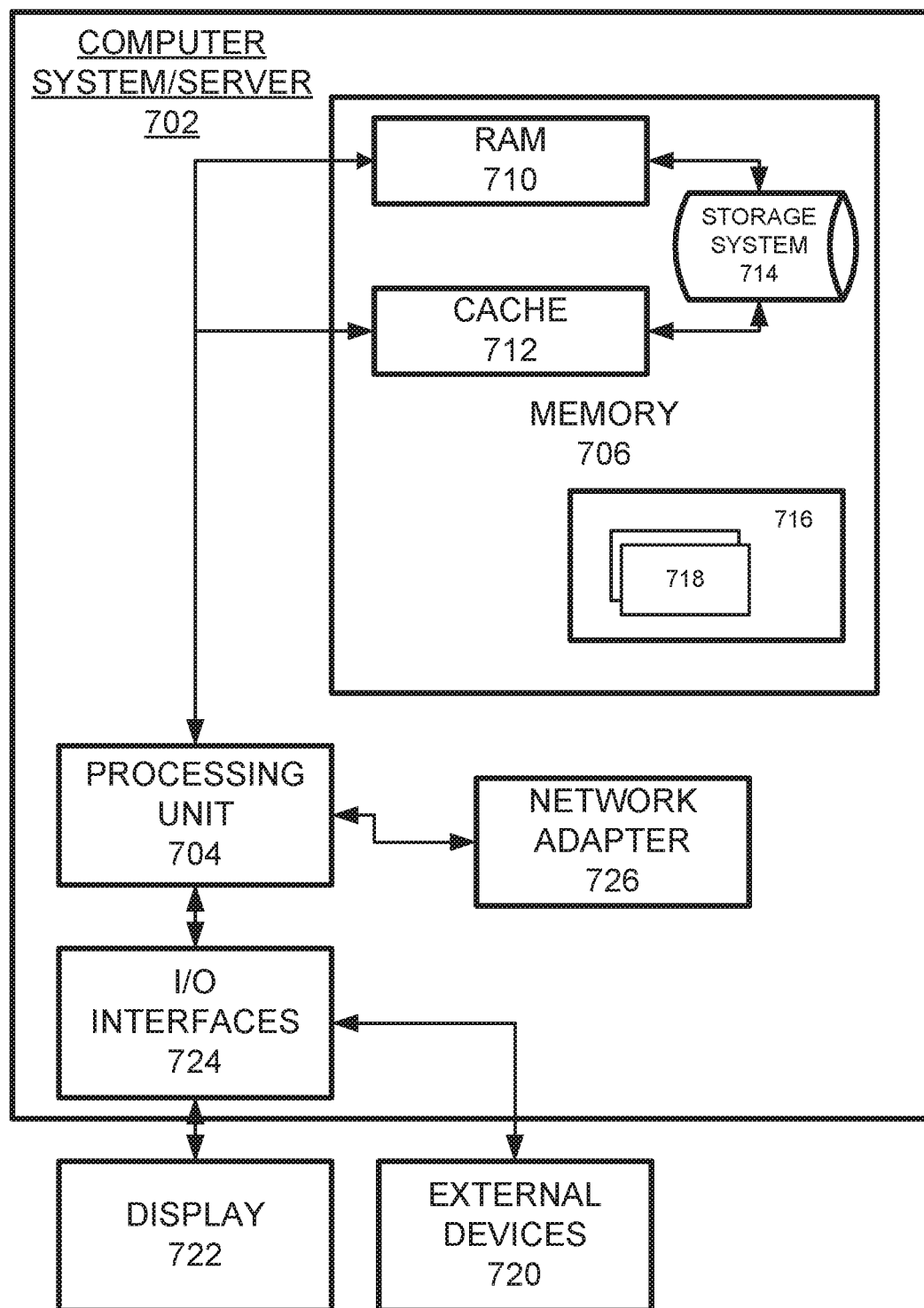
FIG. 7 illustrates an example computer system configured to support one or more of the example embodiments.

FIG. 7 is not intended to suggest any limitation as to the scope of use or functionality of embodiments of the application described herein. Regardless, the computing node 700 is capable of being implemented and/or performing any of the functionality set forth hereinabove.

In computing node 700 there is a computer system/server 702, which is operational with numerous other general purpose or special purpose computing system environments or configurations. Examples of well-known computing systems, environments, and/or configurations that may be suitable for use with computer system/server 702 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 702 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 702 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 702 in cloud computing node 700 is shown in the form of a general-purpose computing device. The components of computer system/server 702 may include, but are not limited to, one or more processors or processing units 704, a system memory 706, and a bus that couples various system components including system memory 706 to processor 704.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 702 typically includes a variety of computer system readable media. Such media may be any available media that is accessible by computer system/server 702, and it includes both volatile and non-volatile media, removable and non-removable media. System memory 706, in one embodiment, implements the flow diagrams of the other figures. The system memory 706 can include computer system readable media in the form of volatile memory, such as random-access memory (RAM) 710 and/or cache memory 712. Computer system/server 702 may further include other removable/non-removable, volatile/non-volatile computer system storage media. By way of example only, storage system 714 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 706 may include at least one program product having a set (e.g., at least one) of program modules that are configured to carry out the functions of various embodiments of the application.

Program/utility 716, having a set (at least one) of program modules 718, may be stored in memory 706 by way of example, and not limitation, as well as an operating system, one or more application programs, other program modules, and program data. Each of the operating system, one or more application programs, other program modules, and program data or some combination thereof, may include an implementation of a networking environment. Program modules 718 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 702 may also communicate with one or more external devices 720 such as a keyboard, a pointing device, a display 722, etc.; one or more devices that enable a user to interact with computer system/server 702; and/or any devices (e.g., network card, modem, etc.) that enable computer system/server 702 to communicate with one or more other computing devices. Such communication can occur via I/O interfaces 724. Still yet, computer system/server 702 can communicate with one or more networks such as a local area network (LAN), a general wide area network (WAN), and/or a public network (e.g., the Internet) via network adapter 726. As depicted, network adapter 726 communicates with the other components of computer system/server 702 via a bus. It should be understood that although not shown, other hardware and/or software components could be used in conjunction with computer system/server 702. Examples, include, but are not limited to: microcode, device drivers, redundant processing units, external disk drive arrays, RAID systems, tape drives, and data archival storage systems, etc.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method, comprising:
   receiving a vehicle request from a user device;
   upon arrival of a vehicle to a requested location, comparing vehicle cryptographic hash key information associated with the vehicle with user device cryptographic hash key information to identify a current status of the vehicle;
   determining whether the current status of the vehicle passes an appraisal standard stored in a smart contract; and
   when the current status of the vehicle is identified as passing the appraisal standard and the cryptographic hash key information associated with the vehicle matches the user device cryptographic hash key information, notifying the user device of an approval of the appraisal standard.

2. The method of claim 1, wherein the appraisal standard is based on an appraisal of current operational software installed on the vehicle.

3. The method of claim 2, wherein the current operational software installed on the vehicle passes the appraisal standard when the current operational software is identified as having one or more of a current build number and a current update patch installed.

4. The method of claim 1, further comprising:
   transmitting a vehicle request command to a vehicle management server, identifying the vehicle to fulfill the vehicle request; and
   transmitting a vehicle dispatch command to the vehicle.

5. The method of claim 1, further comprising:
   when the current status of the vehicle is identified as passing the appraisal standard, creating a blockchain transaction comprising a request for approval from the user device, an approval from an insurance provider, and an approval from an authorization provider.

6. The method of claim 1, wherein comparing vehicle cryptographic hash key information associated with the vehicle with user device cryptographic hash key information to identify a current status of the vehicle further comprises determining a software build installed in the vehicle passes the appraisal standard.

7. The method of claim 1, further comprising:
   accepting, via a vehicle management server, a transaction between the user device and a vehicle service provider when the appraisal is identified as passing the appraisal standard.

8. A system, comprising:
   a user device;
   a vehicle; and
   a computing node;
   wherein the computing node is configured to
     receive a vehicle request from the user device;
     upon arrival of the vehicle to a requested location, compare vehicle cryptographic hash key information associated with the vehicle with user device cryptographic hash key information to identify a current status of the vehicle;
     determine whether the current status of the vehicle passes an appraisal standard stored in a smart contract; and
     when the current status of the vehicle is passes the appraisal standard and the cryptographic hash key information associated with the vehicle matches the user device cryptographic hash key information, notify the user device of an approval of the appraisal standard.

9. The system of claim 8, wherein the appraisal standard is based on an appraisal of current operational software installed on the vehicle.

10. The system of claim 9, wherein the current operational software installed on the vehicle passes the appraisal standard when the current operational software is identified as having one or more of a current build number and a current update patch installed.

11. The system of claim 8, wherein the computing node is further configured to transmit a vehicle request command to a vehicle management server, identify the vehicle to fulfill the vehicle request; and transmit a vehicle dispatch command to the vehicle.

12. The system of claim 8, wherein when the current status of the vehicle passes the appraisal standard, the computing node creates a blockchain transaction which comprises a request for approval from the user device, an approval from an insurance provider, and an approval from an authorization provider.

13. The system of claim 8, wherein when vehicle cryptographic hash key information associated with the vehicle is compared with user device cryptographic hash key information to identify a current status of the vehicle further the computing node determines a software build installed in the vehicle passes the appraisal standard.

14. The system of claim 8, wherein the computing node is configured to accept, via a vehicle management server, a transaction between the user device and a vehicle service provider when the appraisal is passes the appraisal standard.

15. A non-transitory computer readable storage medium configured to store instructions that when executed cause a processor to perform:

receiving a vehicle request from a user device;

upon arrival of a vehicle to a requested location, comparing vehicle cryptographic hash key information associated with the vehicle with user device cryptographic hash key information to identify a current status of the vehicle;

determining whether the current status of the vehicle passes an appraisal standard stored in a smart contract; and when the current status of the vehicle is identified as passing the appraisal standard and the cryptographic hash key information associated with the vehicle matches the user device cryptographic hash key information, notifying the user device of an approval of the appraisal standard.

16. The non-transitory computer readable storage medium of claim 15, wherein the appraisal standard is based on an appraisal of current operational software installed on the vehicle.

17. The non-transitory computer readable storage medium of claim 16, wherein the current operational software installed on the vehicle passes the appraisal standard when the current operational software is identified as having one or more of a current build number and a current update patch installed.

18. The non-transitory computer readable storage medium of claim 15, wherein the processor is further configured to perform:

transmitting a vehicle request command to a vehicle management server, identifying the vehicle to fulfill the vehicle request; and transmitting a vehicle dispatch command to the vehicle.

19. The non-transitory computer readable storage medium of claim 15, wherein the processor is further configured to perform:

when the current status of the vehicle is identified as passing the appraisal standard, creating a blockchain transaction comprising a request for approval from the user device, an approval from an insurance provider, and an approval from an authorization provider.

20. The non-transitory computer readable storage medium of claim 15, wherein the processor is further configured to perform:

accepting, via a vehicle management server, a transaction between the user device and a vehicle service provider, when the appraisal is identified as passing the appraisal standard, and wherein comparing vehicle cryptographic hash key information associated with the vehicle with user device cryptographic hash key information to identify a current status of the vehicle further comprises determining a software build installed in the vehicle passes the appraisal standard.

* * * * *